(12) United States Patent
Bae et al.

(10) Patent No.: US 8,075,821 B2
(45) Date of Patent: Dec. 13, 2011

(54) FABRICATION METHODS OF METAL/POLYMER/CERAMIC MATRIX COMPOSITES CONTAINING RANDOMLY DISTRIBUTED OR DIRECTIONALLY ALIGNED NANOFIBERS

(75) Inventors: Dong-Hyun Bae, Seoul (KR); Sung-Woon Lee, Daejeon (KR); Dae-Yeol Lee, Pohang-si (KR); Seok-Min Moon, Suncheon-si (KR); Sang-Jun Bae, Suwon-si (KR)

(73) Assignee: Applied Carbon Nano Technology Co., Ltd (KR)

( * ) Notice: Subject to any disclaimer, the term of this patent is extended or adjusted under 35 U.S.C. 154(b) by 1060 days.

(21) Appl. No.: 11/914,615

(22) PCT Filed: Mar. 27, 2006

(86) PCT No.: PCT/KR2006/001120
§ 371 (c)(1),
(2), (4) Date: Nov. 16, 2007

(87) PCT Pub. No.: WO2006/123859
PCT Pub. Date: Nov. 23, 2006

(65) Prior Publication Data
US 2008/0219084 A1    Sep. 11, 2008

(30) Foreign Application Priority Data
May 17, 2005  (KR) .................. 10-2005-0040955

(51) Int. Cl.
*B29C 47/00*       (2006.01)
(52) U.S. Cl. ....................... 264/108; 977/742
(58) Field of Classification Search .................. 264/108; 977/742
See application file for complete search history.

(56) References Cited

U.S. PATENT DOCUMENTS

| | | | | |
|---|---|---|---|---|
| 6,312,303 B1 * | 11/2001 | Yaniv et al. | ...... | 445/24 |
| 6,331,265 B1 * | 12/2001 | Dupire et al. | ...... | 264/289.3 |
| 6,599,961 B1 * | 7/2003 | Pienkowski et al. | ...... | 523/120 |
| 6,908,573 B2 * | 6/2005 | Hossan | ...... | 252/511 |
| 7,411,019 B1 * | 8/2008 | Bley | ...... | 524/847 |
| 2001/0052656 A1 * | 12/2001 | Newman et al. | ...... | 264/176.1 |
| 2002/0185770 A1 * | 12/2002 | McKague | ...... | 264/108 |
| 2003/0210606 A1 * | 11/2003 | Chase et al. | ...... | 366/101 |
| 2004/0209977 A1 * | 10/2004 | Hossan | ...... | 523/324 |
| 2006/0066012 A1 * | 3/2006 | Yang et al. | ...... | 264/349 |
| 2006/0115640 A1 * | 6/2006 | Yodh et al. | ...... | 428/221 |
| 2007/0050870 A1 * | 3/2007 | Muller | ...... | 977/742 |

OTHER PUBLICATIONS

C.L. Xu, et al., Fabrication of Aluminum-Carbon Nanotube Composites and Their Electrical Properties, Carbon 37 (1999) 855-858.

S.R. Dong, et al., An Investigation of the Sliding Wear Behavior of Cu-Matrix Composite Reinforced by Carbon Nanotubes, Materials Science and Engineering A313 (2001) 83-87.

Haihui Ye, et al., Reinforcement and Rupture Behavior of Carbon Nanotubes-Polymer Nanofibers. Applied Physics Letters, vol. 85, No. 10, Sep. 2004.

Kunihiko Nishimura, et al., Fabrication of CNT-FED Panel Using Polymer Insulator, Technical Digest of IVMC2003, 49-50.

Jinwei Ning, et al., Surfactants Assisted Processing of Carbon Nanotube-Reinforced SiO2 Matrix Composites, Ceramics International 30 (2004) 63-67.

* cited by examiner

*Primary Examiner* — David Sorkin
(74) *Attorney, Agent, or Firm* — John K. Park; Park Law Firm

(57) ABSTRACT

Disclosed herein is a method for manufacturing a composite having nanofibers uniformly dispersed in a metal, polymer or ceramic matrix. The method comprises mixing the nanofibers with a metallic, polymeric or ceramic material, followed by uniformly dispersing the nanofibers in the material via deformation of the metal, polymer or ceramic matrix by application of mechanical energy to the material; and imparting a directionality to the nanofibers via application of a mechanical mass flowing process to a composite material with the nanofibers uniformly dispersed in the metal, polymer or ceramic matrix. With the method, since the nanofibers can be uniformly dispersed in the metal, polymer or ceramic matrix via a simple mechanical process, the composite can be manufactured through a simple process, thereby enhancing manufacturing efficiency.

9 Claims, 4 Drawing Sheets

[Fig. 1]
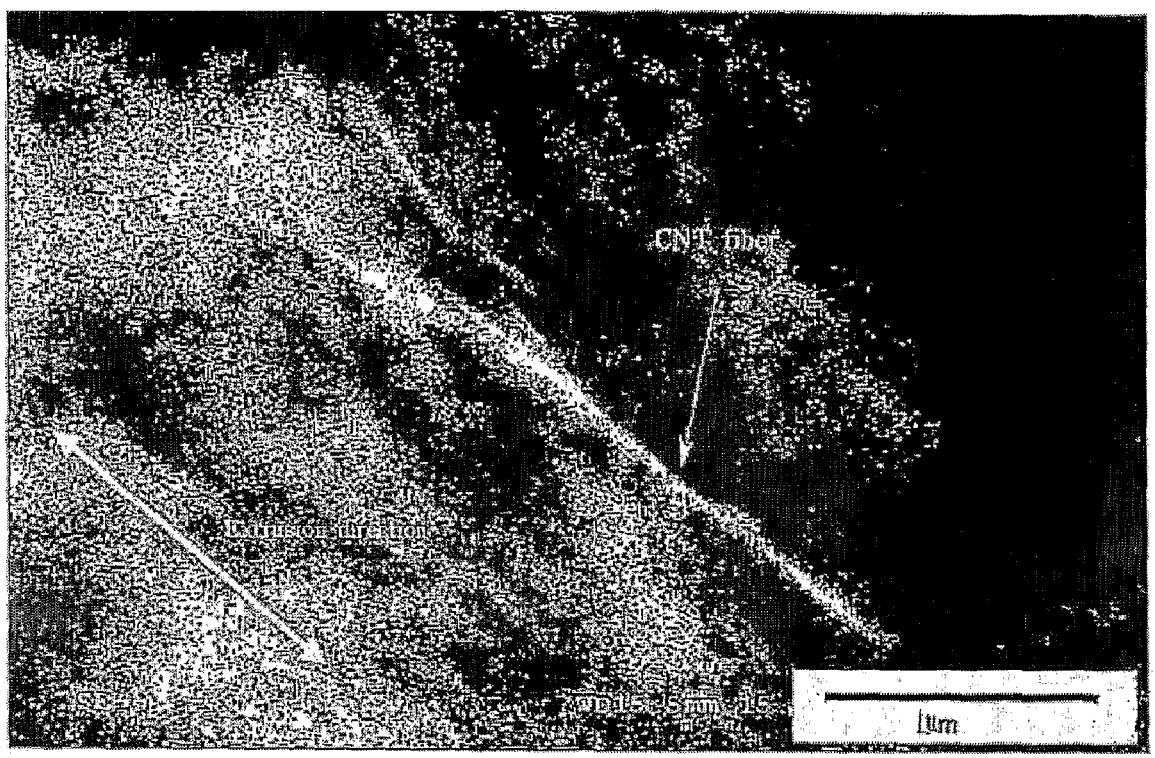

[Fig. 2]
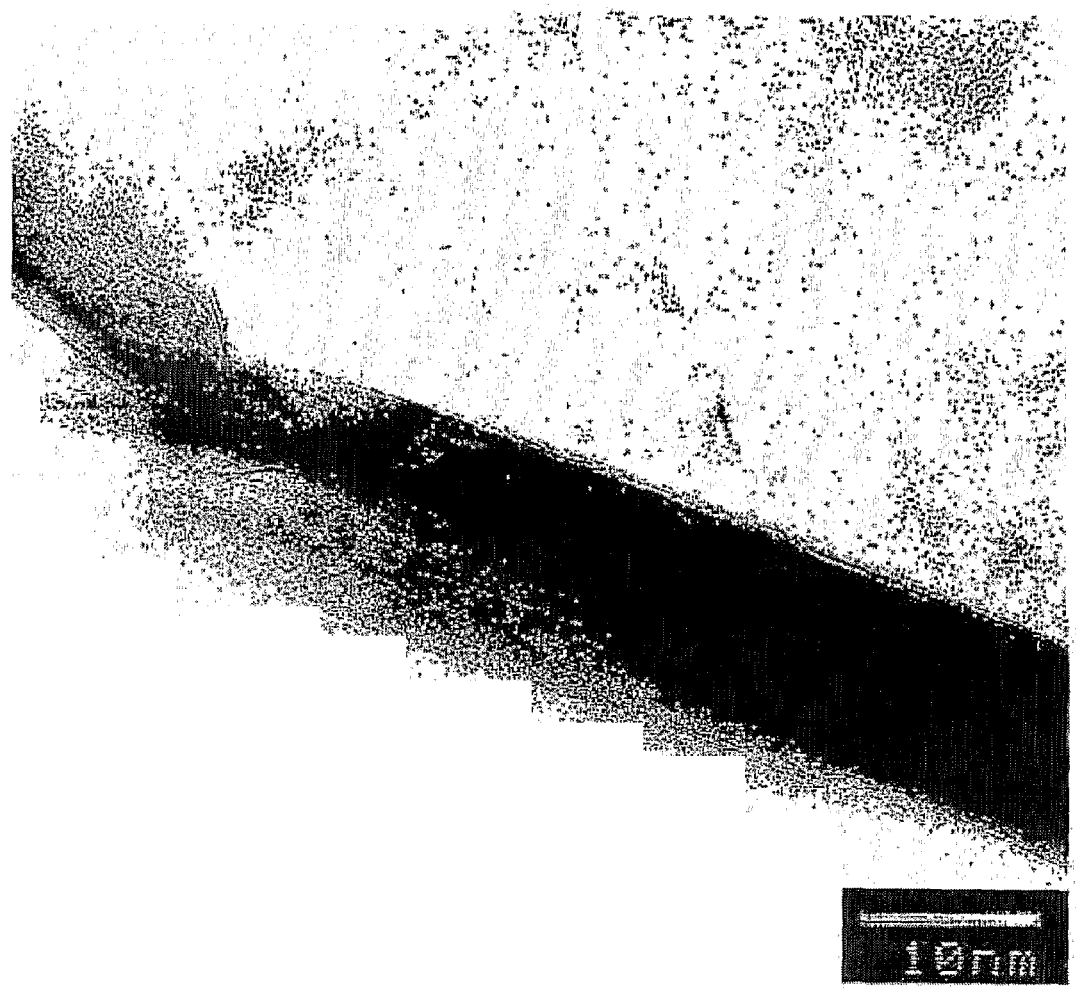
[Fig. 3]
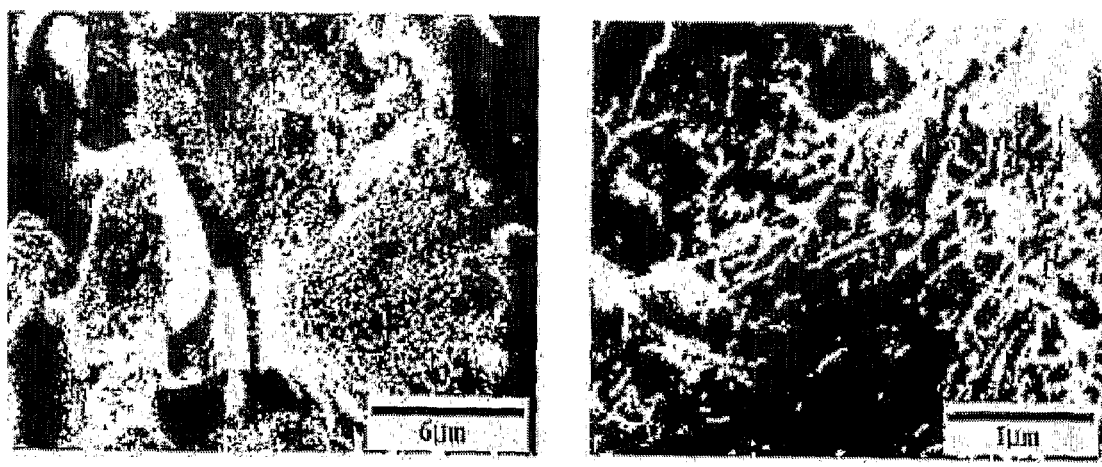

[Fig. 4]
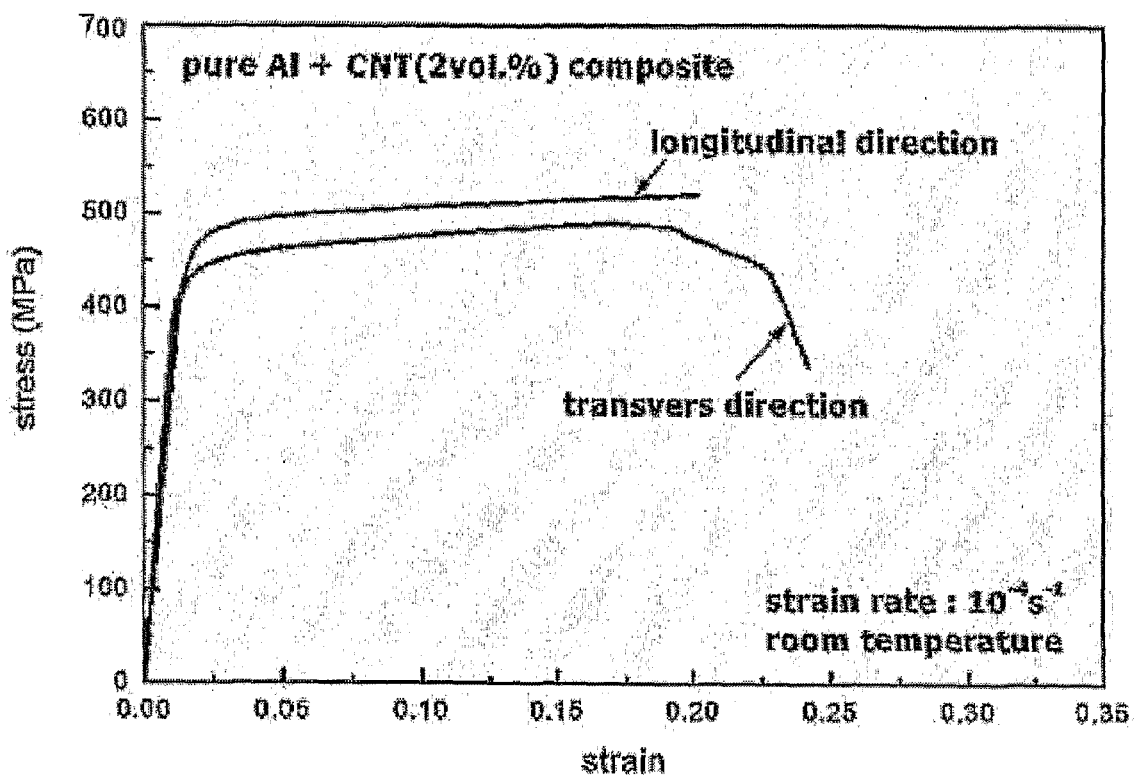
[Fig. 5]
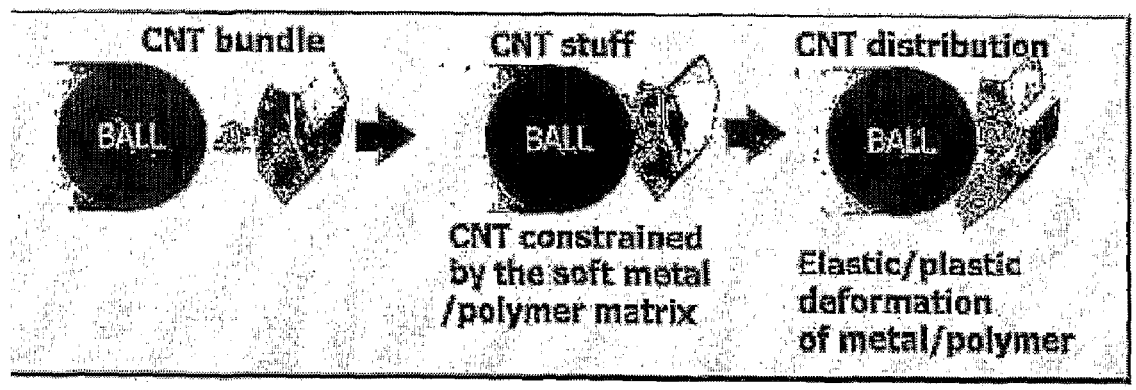

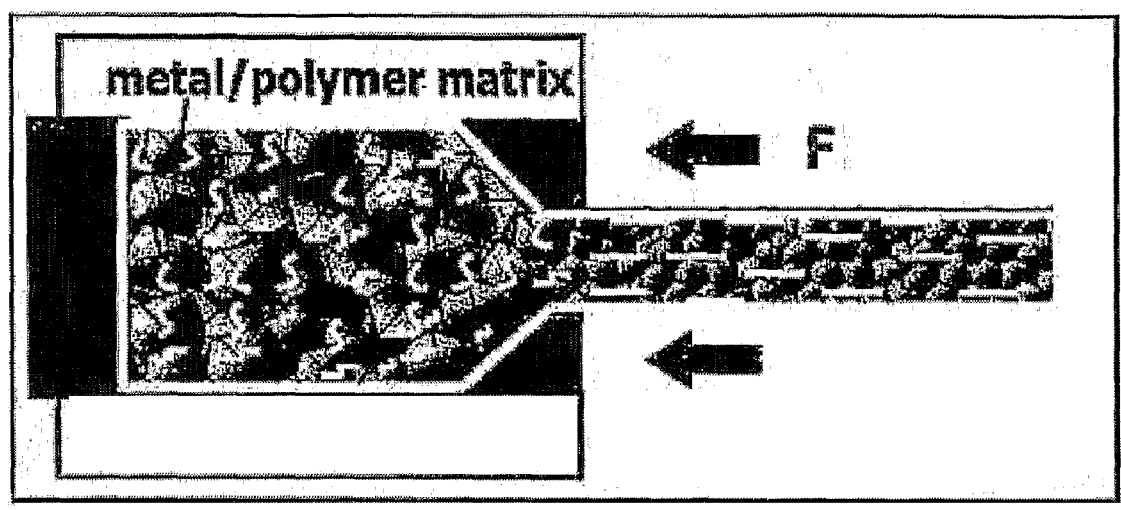
[Fig. 6]

FABRICATION METHODS OF METAL/POLYMER/CERAMIC MATRIX COMPOSITES CONTAINING RANDOMLY DISTRIBUTED OR DIRECTIONALLY ALIGNED NANOFIBERS

TECHNICAL FIELD

The present invention relates to a method for manufacturing a composite having nanofibers uniformly dispersed in a metal, polymer or ceramic matrix. More particularly, the present invention relates to a method for manufacturing a composite which comprises nanofibers uniformly dispersed in a metal, polymer or ceramic matrix via elastic deformation or plastic deformation of the matrix by application of a mechanical impact to the metal, polymer or ceramic matrix and the nanofibers so that the nanofibers have a predetermined direction in the composite via mechanical mass flow of powdered metal, polymer or ceramic matrix having the nanofibers dispersed therein.

BACKGROUND ART

Investigations regarding mixing and dispersing nanofibers with a metal, polymer or ceramic matrix have been progressing for several years. In particular, C. L. Xu, B. Q. Wei, R. Z. Ma, J. Liang, X. K. Ma, D. H. Wu in "Carbon," Vol. 37, 1999, pp 855-858, and J. W. Ning, J. J Zhang, Y. B. Pan and J. K. Guo in "Materials Science and Engineering," Vol. A313, 2001, pp 83-87, describe a method of manufacturing and evaluating a composite such as carbon nanotube-reinforced aluminum matrix via powder mixing and sintering.

However, in this conventional method, carbon nanotubes are not uniformly dispersed in the aluminum matrix and aggregate at grain boundaries, causing deterioration in sintering capability when producing the composite, and deterioration in mechanical and electrical properties of the composite, which leads to a failure of achieving remarkably enhanced properties. In other words, when the composite is formed, the carbon nanotubes agglomerate on the surface of the powdered metal matrix due to insufficient dispersion of the carbon nanotubes, so that the surface of the metal matrix having agglomeration of the carbon nanotubes acts as a defect, thereby deteriorating the mechanical properties of the matrix while making it difficult to achieve enhanced mechanical properties by addition of the carbon nanotubes.

In addition, Haihui Ye, Hoa Lam, Nick Titchenal, Yury Gogotsi and Frank Ko in "Applied Physics Letters," Vol. 85, No. 10, 2004, pp 1775-1777, and Kunihiko Nishimura, Zhiying Shen, Masahiro Fujikawa, Akihiko Hosono, Noritsuna Hashimoto, Satoru Kawamoto, Shoyu Watanabe, Shuhei Nakata in "Technical Digest of IVMC2003," Vol. O5-4, pp 49-50, describe that a polymer matrix is enhanced in mechanical properties as a composite of the polymer matrix with carbon nanotubes, and is widened in applications, for example, field emission displays (FED), by using the electrical properties of the carbon nanotubes.

However, since such a conventional method of dispersing the carbon nanotubes comprises complicated processes such as dispersion in a dispersive solvent, sintering, etc., there is a need of a method for uniform dispersion of the carbon nanotubes through a simple process in order to enhance manufacturing efficiency.

There is a method which uniformly disperses nanofibers in a metal, polymer or ceramic matrix via various processes, such as ultrasonic treatment, mixing of metallic salts, ultrasonic treatment, drying, calcination, reduction, and the like after dispersing the nanofibers in the metal, polymer or ceramic matrix via a suitable dispersive solvent. However, this method requires controlling of various process factors such as kinds of dispersive solvent, amount of solvent according to a fraction, calcination temperature, reduction conditions, etc., and must be performed for several processes requiring a great deal of time. Thus, this method has problems in that it is difficult to manufacture a reproducible composite, and in that industrial efficiency is reduced.

Meanwhile, although various methods for enhancing the directionality of the carbon nanotubes have been investigated in order to enhance the mechanical and electrical properties, there is still a need of a method which solves the problem of complicated processing conditions.

DISCLOSURE OF INVENTION

Technical Problem

Therefore, the present invention has been made in view of the above problems, and it is an object of the present invention to provide a method for manufacturing a composite powder which comprises nanofibers uniformly dispersed in a metal, polymer or ceramic matrix via a mechanical process without agglomeration of the nanofibers in the matrix.

It is another object of the invention to provide the method which can ensure directionality of the nanofibers within the composite through a mechanical mass flowing process of the composite powder.

Technical Solution

In accordance with an aspect of the present invention, the above and other objects can be accomplished by the provision of a method for manufacturing a composite having nanofibers uniformly dispersed in a metal, polymer or ceramic matrix, comprising: mixing the nanofibers with a metallic, polymeric or ceramic material, followed by uniformly dispersing the nanofibers in the material via deformation of the metal, polymer or ceramic matrix by application of mechanical energy to the material; and imparting a directionality to the nanofibers via application of a mechanical mass flowing process to a composite material with the nanofibers uniformly dispersed in the metal, polymer or ceramic matrix.

The mixing and dispersing of the nanofibers may comprise mixing the nanofibers with the metallic, polymeric or ceramic material in a container to form a mixture; adding balls to the mixture; moving the balls to cause the balls to give an impact to the metallic, polymeric or ceramic material and the nanofibers; and causing elastic deformation or plastic deformation of the metallic, polymeric or ceramic matrix so as to allow the nanofibers to infiltrate the metal or polymer material.

The imparting of the directionality to the nanofibers may comprise loading a material having the nanofibers uniformly dispersed therein into a container; maintaining the material at a predetermined temperature in the container; and compressing the material in one direction to deform the material in the compressing direction.

The metallic material may be a pure metal selected from aluminum (Al), copper (Cu), iron (Fe) and titanium (Ti), or alloys thereof.

The polymeric material may be a polymer selected from thermoplastic resin, elastomer, thermosetting elastomer, and thermoplastic elastomer.

The ceramic material may be any one single-component ceramic material selected from alumina ($Al_2O_3$), silica (SiO$_2$) and magnesia (MgO), or a composite ceramic material comprising at least one of the single-component ceramic materials.

The nanofibers may comprise carbon nanotubes or carbon nanofibers having a diameter of 50 nm or less.

The mechanical mass flowing process may be at least one machining process selected from extrusion, rolling and injection.

The nanofibers may be added in a weight ratio of 0~50 wt % to the metal, polymer or ceramic matrix.

Advantageous Effects

As apparent from the description, with the method according to the present invention, the nanofibers can be uniformly dispersed in the metal or polymer matrix composite via a simple mechanical process such as ball milling, hand milling and the like, thereby simplifying the manufacturing process, and enhancing manufacturing efficiency compared with a conventional method in which the nanofibers are dispersed in a dispersive solvent via several processes such as dispersion, calcinations and the like.

In addition, according to the present invention, the directionality of the nanofibers is ensured through the mechanical mass flowing process such as rolling, extrusion, injection and the like, thereby remarkably widening industrial applications of the nanofibers as high strength, high toughness and functional materials, in particular, as light-weight structural materials and conductive materials in the field of spacecrafts, automobiles, ocean engineering, electronics, etc.

BRIEF DESCRIPTION OF THE DRAWINGS

FIG. 1 is a transmission electron microscopy (TEM) image of Composite 1 in Table 1, showing dispersion degree and anisotropy of carbon nanotubes in the Composite 1;

FIG. 2 is a TEM image of Composite 2 in Table 1, showing a dispersion degree of carbon nanotubes of the Composite 2, and perfect bonding of the carbon nanotubes in a matrix;

FIG. 3 is a TEM image of Composite 6 in Table 1, showing uniform dispersion of carbon nanotubes in the Composite 6;

FIG. 4 is a graph depicting relationship between stress and strain of the Composite 1 in Table 1;

FIG. 5 is a diagram showing a uniform dispersion process of carbon nanotubes in a metal or polymer composite; and FIG. 6 is a diagram showing a process for unidirectional arrangement of the carbon nanotubes in the metal or polymer composite.

BEST MODE FOR CARRYING OUT THE INVENTION

Preferred embodiments of a method for manufacturing a composite having nanofibers uniformly dispersed in a metal, polymer or ceramic matrix according to the present invention will be described in detail with reference to the accompanying drawings.

The method of the present invention employs a mechanical process to uniformly disperse nanofibers in a metal, polymer or ceramic matrix. The method comprises: mixing nanofibers with a metallic, polymeric or ceramic material, followed by uniformly dispersing the nanofibers in the material via deformation of the metal, polymer or ceramic material by application of mechanical energy to the material; and imparting a directionality to the nanofibers in the composite via a mechanical mass flowing process, such as extrusion, rolling, injection and the like, of a composite material with the nanofibers uniformly dispersed in the metal, polymer or ceramic matrix.

The mixing and dispersing of the nanofibers comprises mixing the nanofibers with the metallic, polymeric or ceramic material in a container to form a mixture; adding balls to the mixture; moving the balls through application of mechanical energy to the balls to cause the balls to give an impact to the metallic/polymeric/ceramic material and the nanofibers; causing elastic deformation or plastic deformation of the metallic, polymeric or ceramic material by the mechanical impact so as to allow the nanofibers to infiltrate the material (metal/polymer/ceramic material); and allowing the nanotubes to be uniformly dispersed in the material by continuous elastic deformation or plastic deformation of the metallic, polymeric or ceramic material through continuous impact of the balls.

In the method of the invention, a dispersing time may be different according to kinds of matrix. For example, it is preferable that the nanotubes are dispersed in the matrix for a longer period of time in the case of forming a nickel alloy-based composite than in the case of forming a pure aluminum-based composite. When forming a metal matrix composite having a desired grain size, the dispersing time is preferably increased as the grain size is decreased.

The imparting of the directionality to the nanofibers may comprise loading a material having the nanofibers uniformly dispersed therein into a container; maintaining the material at a predetermined temperature in the container; and compressing the material in one direction to deform the material in the compressing direction. The predetermined temperature is a temperature suitable for material processing via the mass flowing between room temperature and a melting point of the material.

The nanofibers generally have a strength of 30 GPa level, and an elastic coefficient of 1 TPa level. In the present invention, the nanofibers are carbon nanotubes or carbon nanofibers having a diameter of 50 nm or less, although the present invention is not limited to these nanotubes.

According to the present invention, the nanofibers are added in a weight ratio of 0-50 wt % to the metal, polymer or ceramic matrix.

For metal or polymer matrix composite powders, it is possible to secure the directionality of the nanofibers in the matrix by a process, such as hot extrusion, hot rolling, and the like, which can cause mechanical mass flow. The directionality of the nanofibers can be secured by the mechanical mass flowing process of the present invention in a composite formed by a conventional method as well as the composite formed by the method of the present invention. In particular, for a nanofibers-dispersed composite formed by a chemical dispersion method using a dispersive solvent, it is possible to ensure anisotropy of the nanofibers in the composite by the mechanical mass flowing process of the present invention.

Examples of composites formed by the method according to the present invention will be described hereinafter.

EXAMPLES

Table 1 shows kinds of matrix, fractions of carbon nanotubes, mechanical processing methods, results of uniform dispersion, and mechanical mass flowing processes, which were applied to manufacture of the following examples.

TABLE 1

| Sample No. | Matrix | CNT Content (Vol. %) | Milling Time (H) | Milling Speed (RPM) | CNT Dispersion | Method for anisotropy | Anisotropy of CNT |
|---|---|---|---|---|---|---|---|
| Composite 1 | Al | 1 | >1 | >300 | ○ | Hot extrusion | ○ |
|  |  | 3 |  |  | ○ | Hot rolling | ○ |
|  |  | 5 |  |  | ○ | Hot extrusion | ○ |
| Composite 2 | Cu | 1 | >1 | >300 | ○ | Hot extrusion | ○ |
|  |  | 3 |  |  | ○ | Hot extrusion | ○ |
|  |  | 5 |  |  | ○ | Hot rolling | ○ |
| Composite 3 | Ni | 1 | >1 | >300 | ○ | Hot extrusion | ○ |
|  |  | 3 |  |  | ○ | Hot rolling | ○ |
|  |  | 5 |  |  | ○ | Hot extrusion | ○ |
| Composite 4 | Fe | 1 | >1 | >300 | ○ | Hot rolling | ○ |
|  |  | 3 |  |  | ○ | Hot extrusion | ○ |
|  |  | 5 |  |  | ○ | Hot extrusion | ○ |
| Composite 5 | Brass | 1 | >1 | >300 | ○ | Hot rolling | ○ |
|  |  | 3 |  |  | ○ | Hot extrusion | ○ |
|  |  | 5 |  |  | ○ | Hot extrusion | ○ |
| Composite 6 | PMMA | 1 | >1 | >300 | ○ | Hot rolling | ○ |
|  |  | 3 |  |  | ○ | Hot extrusion | ○ |
|  |  | 5 |  |  | ○ | Hot rolling | ○ |
| Composite 7 | PVC | 1 | >1 | >300 | ○ | Hot extrusion | ○ |
|  |  | 3 |  |  | ○ | Hot rolling | ○ |
|  |  | 5 |  |  | ○ | Hot extrusion | ○ |
| Composite 8 | PE | 1 | >1 | >300 | ○ | Hot rolling | ○ |
|  |  | 3 |  |  | ○ | Hot extrusion | ○ |
|  |  | 5 |  |  | ○ | Hot rolling | ○ |
| Composite 9 | Al$_2$O$_3$ | 1 | >1 | >300 | ○ | Hot sintering | ○ |
|  |  | 3 |  |  | ○ | Hot sintering | ○ |
|  |  | 5 |  |  | ○ | Hot sintering | ○ |
| Composite 10 | MgO | 1 | >1 | >300 | ○ | Hot sintering | ○ |
|  |  | 3 |  |  | ○ | Hot sintering | ○ |
|  |  | 5 |  |  | ○ | Hot sintering | ○ |

In Table 1, mark "O" means that uniform dispersion and directionality of carbon nanotubes are secured in a composite.

As can be appreciated from Table 1, for a composite having the carbon nanotubes uniformly dispersed in a metal, polymer or ceramic matrix, uniform dispersion of the carbon nanotubes was accomplished by milling under conditions of a milling time of 1 hour or more and a milling speed of 300 rpm or more irrespective of an increase in fraction of the carbon nanotubes.

In addition, hot extrusion and hot rolling enabled unidirectional arrangement of the carbon nanotubes in the metal or polymer matrix composite.

FIG. 1 is a transmission electron microscopy (TEM) image of Composite 1 in Table 1, showing dispersion degree and anisotropy of carbon nanotubes of the Composite 1, which was formed to have a rod shape by hot extrusion after dispersing the carbon nanotubes for 24 hours. As shown in the micrograph, the carbon nanotubes are uniformly dispersed in one direction.

FIG. 2 is a TEM image of Composite 2 in Table 1, showing a dispersion degree of carbon nanotubes of the Composite 2, and perfect bonding of the carbon nanotubes in a matrix.

FIG. 3 is a TEM image of Composite 6 in Table 1, showing uniform dispersion of carbon nanotubes in the Composite 6, which comprises the carbon nanotubes dispersed in a polymethyl methacrylate (PMMA) matrix by milling for 12 hours. As can be verified in the micrograph, the carbon nanotubes are uniformly dispersed in the composite.

FIG. 4 is a graph depicting relationship between stress and strain of the Composite 1, in which the Composite 1 is subjected to the stress by a strain of 20% or more in order to confirm anisotropy of the Composite 1. FIG. 4 shows results of tests which were performed at a strain rate of $10^{-4}$/s in an extrusion direction and a direction perpendicular to the extrusion by using square-shaped specimens of the Composite 1, each having dimensions of 2×2×4, in order to confirm the anisotropy of mechanical properties of the Composite 1. With the results, it can be verified that, when the specimen is subjected to the stress in the direction perpendicular to the extrusion, the specimen exhibits a low yielding point, and is fractured after the strain of 20%. The reason is that the carbon nanotubes provide different force transfer degrees according to an arranging angle of the carbon nanotubes.

FIG. 5 schematically shows a uniform dispersion process of carbon nanotubes in a metal or polymer composite, in which the carbon nanotubes are uniformly dispersed by a mechanical impact of a ball.

FIG. 6 shows a process for unidirectional dispersion of carbon nanotubes in the metal or polymer composite by hot extrusion.

The invention claimed is:

1. A method for forming a composite having nanofibers uniformly dispersed in a metal, polymer or ceramic matrix, comprising:
   mixing the nanofibers with a metallic, polymeric or ceramic material to form a mixture; and
   uniformly dispersing the nanofibers in the material via deformation of the metal, polymer or ceramic matrix by application of mechanical energy to the material;
   wherein the uniformly dispersing of the nanofibers comprises: adding balls to the mixture; moving the balls to cause the balls to give an impact to the metallic, polymeric or ceramic material and the nanofibers; and causing elastic deformation or plastic deformation of the metallic, polymeric or ceramic matrix so as to allow the nanofibers to infiltrate the metal, polymer or ceramic matrix.

2. The method according to claim 1, wherein the metallic material is a pure metal selected from aluminum (Al), copper (Cu), iron (Fe) and titanium (Ti), or alloys thereof.

3. The method according to claim 1, wherein the polymeric material is a polymer selected from thermoplastic resin, elastomer, thermosetting elastomer, and thermoplastic elastomer.

4. The method according to claim 1, wherein the ceramic material is any one single-component ceramic material selected from alumina (Al2O3), silica (SiO2) and magnesia (MgO), or a composite ceramic material comprising at least one of the single-component ceramic materials.

5. The method according to claim 1, wherein the nanofibers comprise carbon nanotubes or carbon nanofibers having a diameter of 50 nm or less.

6. The method according to claim 1, wherein the nanofibers are added in a weight ratio of 0-50 wt % to the metal, polymer or ceramic matrix.

7. The method according to claim 1, further comprising:
   imparting a directionality to the nanofibers via application of a mechanical mass flowing process to the composite material with the nanofibers uniformly dispersed in the metal, polymer or ceramic matrix.

8. The method according to claim 7, wherein the imparting of the directionality to the nanofibers comprises:
   loading the material having the nanofibers uniformly dispersed therein into a container; maintaining the material at a predetermined temperature in the container; and compressing the material in one direction to deform the material in the compressing direction.

9. The method according to claim 7, wherein the mechanical mass flowing process is at least one machining process selected from extrusion, rolling and injection.

\* \* \* \* \*